United States Patent [19]

Albrow et al.

[11] Patent Number: 5,987,023
[45] Date of Patent: Nov. 16, 1999

[54] TRANSMISSION TIMING CONTROL IN DIGITAL RADIO TELEPHONY

[75] Inventors: Richard John Albrow, Hadstock; Simon Alexander Black, Whittlesford; Leigh Carter, Haslingfield; Rupert Leslie Alexander Goodings, Cambridge; Paul Maxwell Martin, Newmarket; Neil Philip Piercy, Newton, all of United Kingdom

[73] Assignee: Ionica International, Limited, United Kingdom

[21] Appl. No.: 08/809,124

[22] PCT Filed: Sep. 8, 1995

[86] PCT No.: PCT/GB95/02135

§ 371 Date: May 23, 1997

§ 102(e) Date: May 23, 1997

[87] PCT Pub. No.: WO96/08885

PCT Pub. Date: Mar. 21, 1996

[30] Foreign Application Priority Data

Sep. 16, 1994 [GB] United Kingdom .................. 9418749

[51] Int. Cl.[6] ................................................ H04J 3/06
[52] U.S. Cl. ...................... 370/350; 370/500; 370/508
[58] Field of Search ................................. 370/324, 328, 370/350, 503, 516, 517, 519, 500, 507, 508

[56] References Cited

U.S. PATENT DOCUMENTS 5,479,409 12/1995 Dupuy et al. .......................... 370/357
5,488,611  1/1996 Zijderhand et al. .................... 370/350
5,586,119 12/1996 Scrobamp et al. ...................... 370/350

FOREIGN PATENT DOCUMENTS 58-036034  2/1983  Japan .............................. H04B 7/26

OTHER PUBLICATIONS

M. de Couesnogle et al, "IRT 2000: System for telephone and data at remote sites", pp. 1–19, Systems Review, vol., 47, No. 2, Jun. 1989.
A Copy of the International Search Report.

Primary Examiner—Min Jung
Attorney, Agent, or Firm—Fish & Richardson P.C.

[57] ABSTRACT

In time domain multiplex/time domain multiple access communications between a base station and subscriber unit, the base station sends a timing reference signal. A subscriber unit responds with a data packet (a) sufficiently short to ensure correct reception by the base irrespective of transmission time. The base determines the transmission time taken and instructs the subscriber unit to advance its timings so that longer data packets (b) can be sent so as to be received when expected. The timing adjustment includes both a fixed present component dependent on approximate separation of base station and subscriber unit, and a second component from measurement of the transmission time taken.

13 Claims, 5 Drawing Sheets

DOWNLINK/UPLINK TIMING AND TRANSMISSION OF AN UPLINK PILOT PACKET

DOWNLINK/UPLINK TIMING AND TRANSMISSION
OF AN UPLINK PILOT PACKET $T_{btx}$ BTE TRANSMIT REFERENCE FRAME TIMING
$T_{brx}$ BTE RECEIVE FRAME TIMING
$T_{ntx}$ NTE RECEIVE TIMING-DELAYED BY $t_{pd}$
$T_{nrx}$ NTE TRANSMIT TIMING
$t_{pd}$ BTE TO NTE PROPAGATION DELAY
$t_{fixed}$ BTE UPLINK-DOWNLINK FIXED TIMING OFFSET
$t_{preset}$ NTE PRESET TRANSMIT TIMING ADVANCE

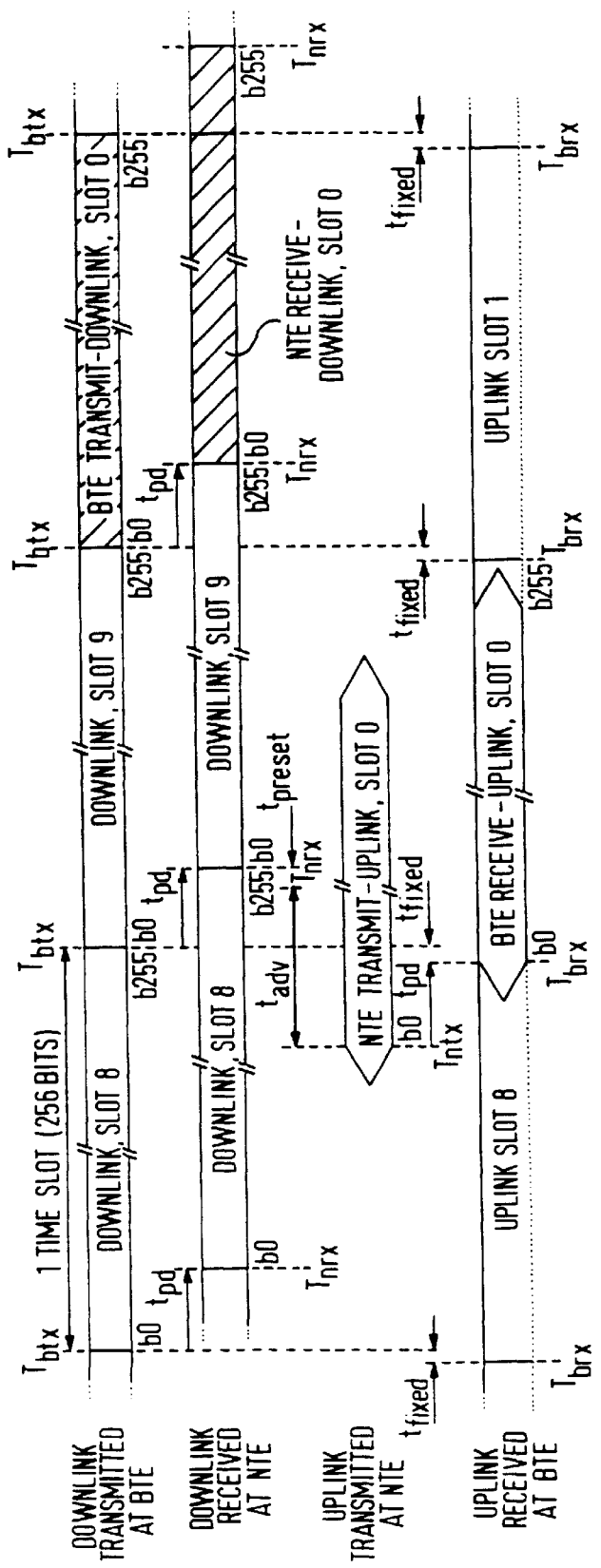

FIG. 4

TRANSMISSION OF AN UPLINK NORMAL PHYSICAL PACKET
USING NTE ADAPTIVE TIME ALIGNMENT $T_{btx}$  BTE TRANSMIT REFERENCE FRAME TIMING
$T_{brx}$  BTE RECEIVE FRAME TIMING
$T_{ntx}$  NTE RECEIVE TIMING-DELAYED BY $t_{pd}$
$T_{nrx}$  NTE TRANSMIT TIMING
$t_{pd}$   BTE TO NTE PROPAGATION DELAY
$t_{fixed}$ BTE UPLINK-DOWNLINK FIXED TIMING OFFSET
$t_{preset}$ NTE PRESET TRANSMIT TIMING ADVANCE
$t_{adv}$  NTE ADAPTIVE TRANSMIT TIMING ADVANCE

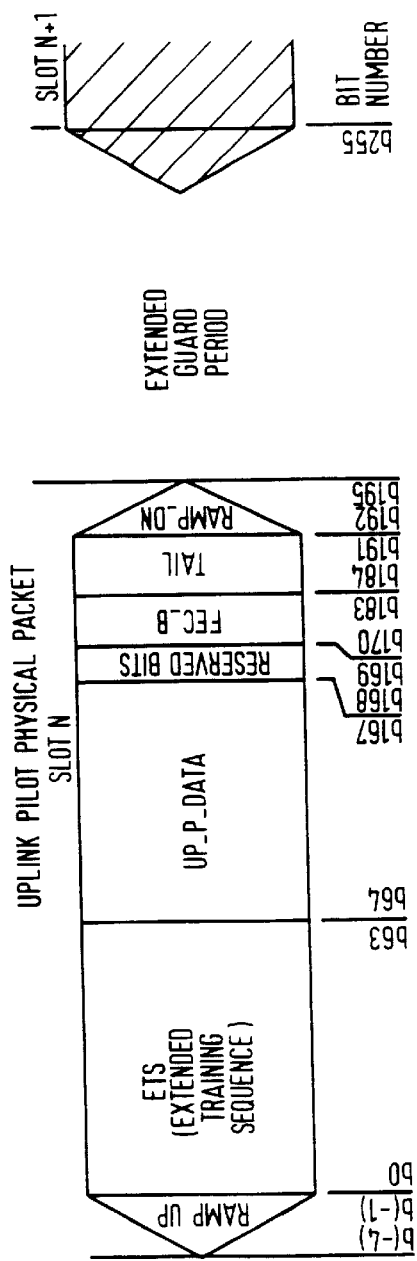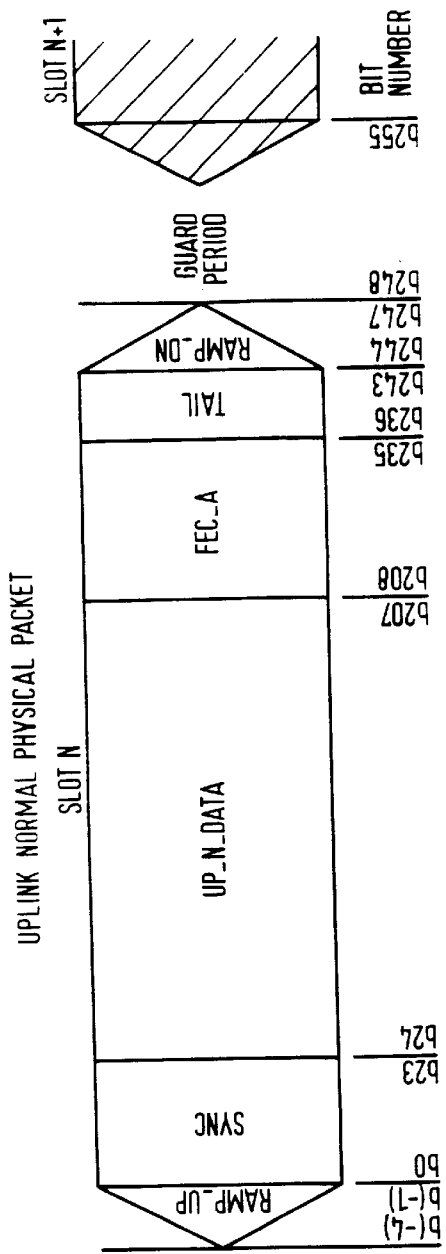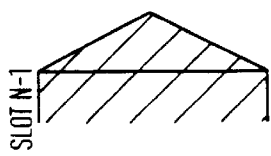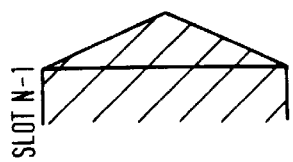

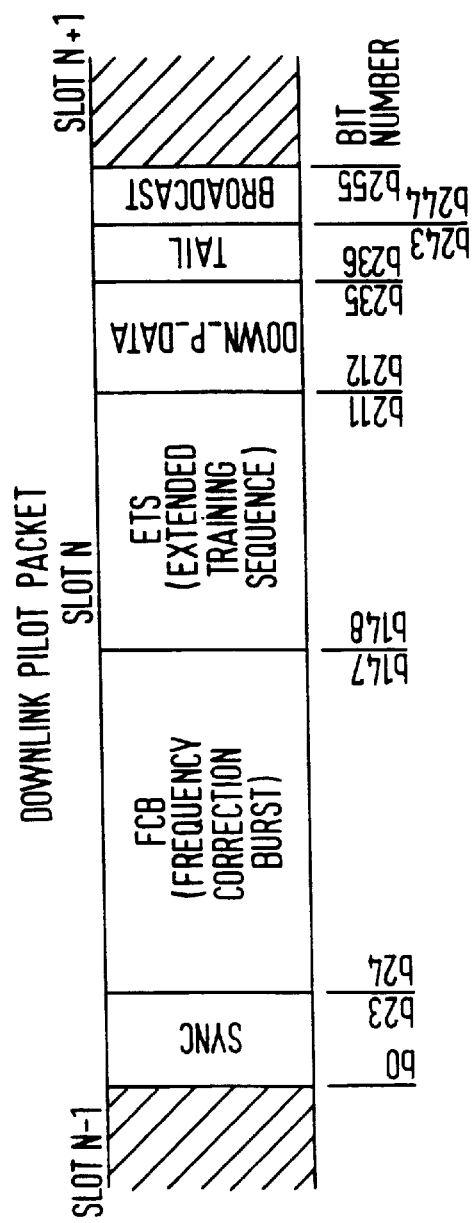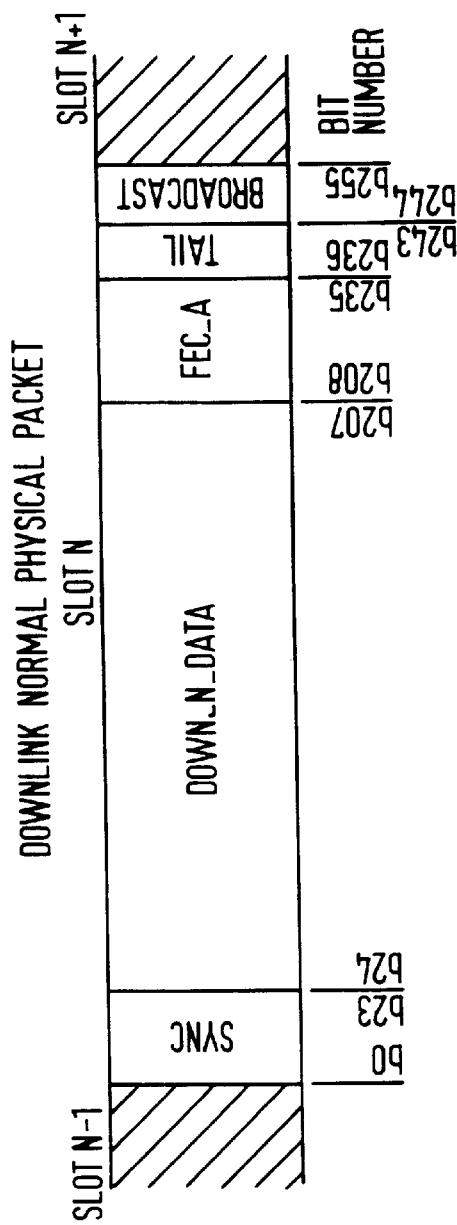

TRANSMISSION TIMING CONTROL IN DIGITAL RADIO TELEPHONY

This is a continuation of PCT Application No. PCT/GB95/02135, filed Sep. 8, 1995.

This invention relates to controlling the timing of transmission of data packets in predetermined time slots of fixed length time frames.

Time division multiplex/time division multiple access (TDM/TDMA) communication requires that signals from various subscriber units communicating with a base station must reach the base station at appropriate times, otherwise, portions of two or more data packets from different subscriber units might reach the base station at the same instant, and then the base station would not be able to receive all packets correctly. In conventional TDM/TDMA systems, such as GSM ("Global System for Mobile communications") systems, a base station sends reference timing signals to the subscriber units, having informed each subscriber unit how much in advance of the reference signal it should transmit in order that transmissions from the subscriber units are received with the correct timing at the base station. In consequence, each data packet is correctly aligned in its TDMA time slot at the base station. Without such adaptive time alignment, packets would have to be separated by sufficiently large guard periods to allow for the possible maximum time delay between subscriber units and the base station, resulting in inefficient spectrum usage.

The present invention in its various aspects is defined in the claims to which reference should now be made.

The present invention in one aspect relates to a method of controlling the timing of transmissions of data packets from at least one first transmitting and receiving unit (NTE) for reception by a second transmitting and receiving unit (BTE) in predetermined time slots within fixed length time frames, the second unit transmitting a timing reference signal to a first unit, the first unit transmitting selectably in response a relatively short first packet at a time dependent on a preset first value, the subscriber first value being a predetermined estimate of the propagation delay dependent on the approximate separation of the first unit and the second unit, the second unit determines a second value dependent upon the propagation delay from the time of reception of the first packet, and the second unit transmits an adjustment signal dependent upon the second value to the first unit to adjust the timing of subsequent transmissions of relatively long packets from the subscriber un:. in response thereto.

The timing adjustment for a first unit includes a first component representative of the second value determined by measuring the time for arrival of the pilot packet from the subscriber unit and a second component representative of the pre-set first value which is predetermined according to the approximate separation of subscriber unit and base station. The first component can be variable, and once the first component is determined, a message is sent to the subscriber unit setting the timing adjustment to be used for subsequent information packets.

Adaptive time alignment according to the present invention involves transmission of pilot packets from a subscriber unit to the base station. Pilot packets are of shorter duration than normal packets. The shorter duration of pilot packets ensures that pilot packets are received from different subscriber units at the base station such that they do not overlap in time. Pilot packets can contain system control data and/or short information messages, whereas normal packets, which are longer, can contain both system control data and other information, such as user data.

Timing control means for controlling the timing of transmission of data packets from a first transmitting and receiving unit (NTE) for reception by a second transmitting and receiving unit (BTE) in predetermined time slots within fixed length time frames, the second unit comprising timing reference signal transmission means, and the first unit comprising response means operative to transmit selectably in response to receipt of a timing reference signal a relatively short first packet at a time dependent on a preset first value, the first value being a predetermined estimate of the propagation delay dependent on the approximate separation of the first unit and the second unit, the second unit further comprising determination means operative to determine a second value dependent upon the propagation delay from the time of reception of the first packet, and the second unit further comprising controlling means operative to transmit an adjustment signal dependent upon the second value to the first unit, the first unit further comprising adjustment means operative to adjust the timing of subsequent transmissions of relatively long packets in response thereto.

A method of adjustment of timing of up-link and down-link packets sent in time slots within fixed length time frames, including a reference signal being sent from a base station, a relatively short first packet being sent from a subscriber unit in response to said reference signal, the relatively short first packet being sent at a time dependent on a preset value, the preset value being a predetermined estimate of the propagation delay dependent on the approximate separation of the first unit and the second unit, and a timing adjustment being determined by the base station by measuring the timing of receipt of said first packet, and an adjustment signal dependent upon said timing adjustment being transmitted to the subscriber unit to adjust its timing of subsequent transmissions of relatively long packets.

A preferred embodiment of the invention will now be described by way of example with reference to the drawings in which:

FIG. 4 is a diagram showing timing adjustment for a normal packet which is transmitted up-link;

FIG. 5(a) is a representation of an up-link pilot packet;

FIG. 5(b) is a representation of an up-link normal packet for comparison with the up-link pilot packet shown in FIG. 5(a);

FIG. 6(a) is a representation of a down-link pilot packet;

FIG. 6(b) is a representation of a down-link normal packet, for comparison with FIG. 6(a).

THE BASIC SYSTEM

Figure 1:
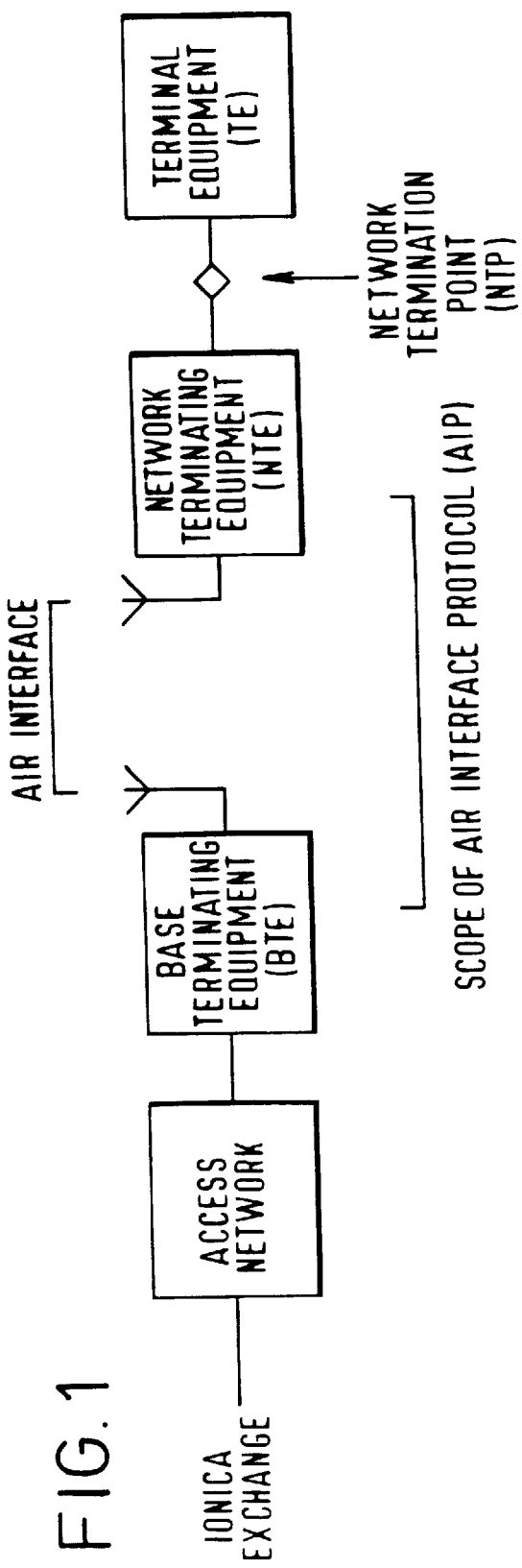
FIG. 1 is a schematic diagram illustrating the system including a base station (BTE—Base Terminating Equipment) and subscriber unit (NTE—Network Equipment)

As shown in FIG. 1, the preferred system is part of a telephone system in which the local wired loop from exchange to subscriber has been replaced by a full duplex radio link between a fixed base station and fixed subscriber unit. The preferred system includes the duplex radio link, and transmitters and receivers for implementing the necessary protocol. There are similarities between the preferred system and digital cellular mobile telephone systems such as GSM which are known in the art. This system uses a protocol based on a layered model, in particular the following layers: PHY (Physical), MAC (Medium Access Control). DLC (Data Link Control), NWK (Network).

One difference compared with GSM is that, in the preferred system, subscriber units are at fixed locations and there is no need for hand-off arrangements or other features relating to mobility. This means, for example, in the preferred system directional antennae and mains electricity can be used.

Figure 2:
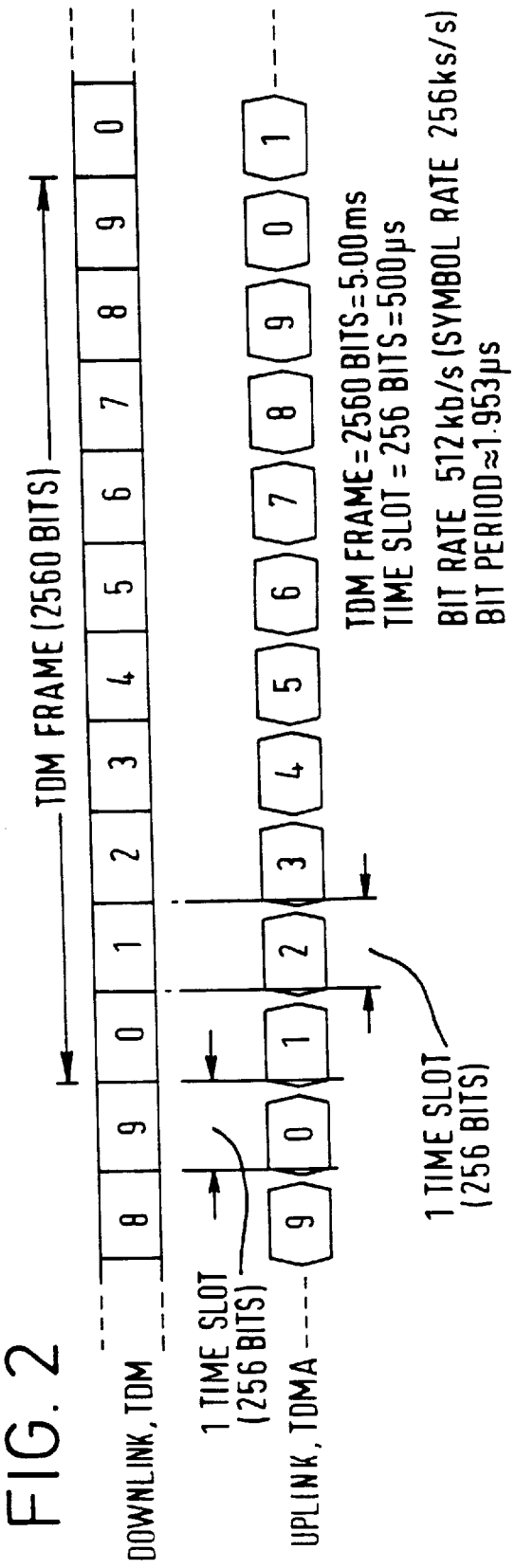
FIG. 2 is a diagram illustrating frame structure and timing for a duplex link.

Each base station in the preferred system provides six duplex radio links at twelve frequencies chosen from the overall frequency allocation, so as to minimize interference between base stations nearby. The frame structure and timing for a duplex link is illustrated in FIG. 2. Each duplex radio link comprises an up-link from a subscriber unit to a base station and, at a fixed frequency offset, a down-link from the base station to the subscriber unit. The down-links are TDM, and the up-links are TDMA. Modulation for all links is $\pi/4$ - DQPSK, and the basic frame structure for all links is ten slots per frame of 2560 bits. The bit rate is 512kbps. Down-links are continuously transmitted and incorporate a broadcast channel for essential system information. When there is no user information to be transmitted the down-link transmissions continue to use the basic frame and slot structure and contain a suitable fill pattern.

For both up-link and down-link transmissions, there are two types of slot: normal slots which are used after call set-up, and pilot slots used during call set-up.

As shown in FIG. 6b, each down-link normal slot comprises 24 bits of synchronisation information, followed by 24 bits designated S-field which includes an 8 bit header, followed by 160 bits designated D-field. This followed by 24 bits Forward Error Correction, and an 8-bit tail, followed by 12 bits of the broadcast channel. The broadcast channel consists of segments in each of the slots of a frame which together form the down-link common signalling channel which is transmitted by the base station, and contains control messages containing link information such as slot lists, multi-frame and super-frame information, connectionless messages and other information basic to the operation of the system.

During call set-up, each down-link pilot slot contains, as shown in FIG. 6a, frequency correction data and a training sequence for receiver initialization, with only a short S-Up-link slots basically contain two different types of data packet, as shown in FIG. 5. The first type of packet, called a pilot packet, is used before a connection is set up, for example, for an Aloha call request and to allow adaptive time alignment (see FIG. 5a). The other type of data packet, called a normal packet, is used when a call has been established and is a larger data packet, due to the use of adaptive time alignment (see FIG. 5b).

Each up-link normal packet contains a data packet of 244 bits which is proceeded and followed by a ramp of 4 bits duration. The ramps and the remaining bits left of the 256 bit slot provide a guard gap against interference from neighbouring slots due to timing errors. Each subscriber unit adjusts the timing of its slot transmissions to compensate for the time it takes signals to reach the base station. Each up-link normal data packet comprises 24 bits of synchronisation data followed by an S-field and D-field of the same number of bits as in each down-link normal slot.

Each up-link pilot slot contains a pilot data packet which is 192 bits long preceded and followed by 4 bit ramps defining an extended guard gap of 60 bits. This larger guard gap is necessary because there is no timing information available and without it propagation delays would cause neighbouring slots to interfere. The pilot packet comprises 64 bits of sync followed by 104 bits of S-field which starts with an 8 bit header and finishes with a 16 bit Cyclic Redundancy Check, 2 reserved bits, 14 forward error correction FEC bits, and 8 tail bits. There is no D-field.

The S-fields in the above mentioned data packets can be used for two types of signalling. The first type is MAC signalling (MS) and is used for signalling between the MAC layer of the base station and the MAC layer of a subscriber unit whereby timing is of importance. The second type is called associated signalling, which can be slow or fast and is used for signalling between the base station and subscriber units in the DLC or NWK layers.

The D-field is the largest data field, and in the case of normal telephony contains digitised speech samples, but can also provide non-speech data samples.

Provision is made in the preferred system for subscriber unit authentication using a challenge response protocol. General encryption is provided by combining the speech or data with a non-predictable sequence of cipher bits produced by a key stream generator which is synchronised to the transmitted super-frame number.

In addition, the transmitted signal is scrambled to remove dc components.

Adaptive Time Alignment

Adaptive time alignment allows the guard period between normal up-link packets to be reduced by compensating for the time delay in propagation.

For a given subscriber unit, the round trip propagation delay (base to subscriber to base) is determined at the base by comparing the timing of the received packets to the down-link timing. The base programmes the subscriber unit to transmit at times advanced by the measured round trip propagation time, so as to ensure packets are received by the base precisely within the respective time slots allocated for their reception.

Without adaptive time alignment, the guard period allowed when normal up-link packets are used, would be insufficient. Accordingly, until the normal transmission timing of the subscriber unit is set, a normal packet cannot be sent as there is a danger it will collide with the contents of the following time slot. In this situation, it is an up-link pilot packet which is transmitted. The pilot packet being shorter allows an extended guard period which enables it to be correctly received without requiring any adjustment of the subscriber unit transmission timing.

The maximum range between the base station and a subscriber unit that can be supported using an up-link pilot packet with no timing advance, is approximately 10 km. Beyond this range, the round trip propagation time exceeds the extended guard period provided by using the shorter pilot packets. However, for greater ranges, a further preset timing advance can be provided which means subscriber units at greater distances can be used. The preset advance is applied to up-link pilot packet transmissions such that a transmitted pilot packet is received within the correct time slot by the base. The base compares the timing of the received packet to the down-link timing, and programmes the subscriber unit with a corresponding advance, known as an adaptive advance. The total advance applied to an up-link normal packet transmission is then the sum of the preset advance and the adaptive advance. The total advance is equal to the round trip propagation time.

Figure 3:
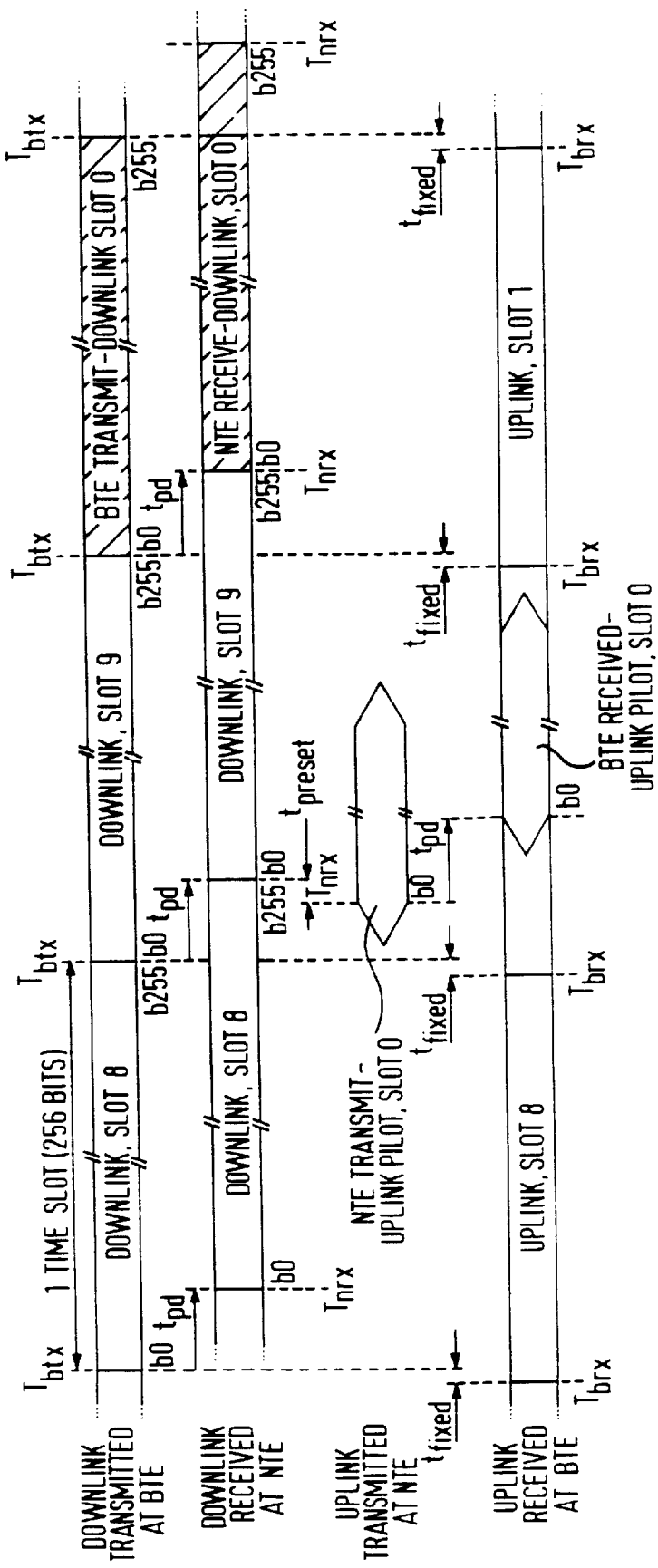
FIG. 3 is a diagram showing down-link/up-link timing and the transmission of an up-link pilot packet, where up-link is from a subscriber unit (NTE—Network Terminal Equipment) to a base station (BTE—Base Terminal Equipment)

The precise timing relationships between up-link and down-link packets is illustrated in FIG. 3, and the timing of an up-link normal packet with adaptive time alignment is shown in FIG. 4.

The timing between up-link packets and down-link packets is also adjusted by a timing offset taxed shown in FIGS. 3 and 4 for both up-link pilot packets and up-link normal packets.

The following parameters are defined for adaptive time alignment;

Resolution of adaptive advance, tadv=1 bit
Minimum adaptive advance, tadv=0 bits
Maximum adaptive advance, tadv=36 bits (=10 km maximum range Subscriber to Base)
Resolution of preset advance, $t_{preset}$=1bit
Minimum preset advance, $t_{preset}$=0 bits
Maximum total timing advance at the Subscriber, $t_{adv}$+ $t_{preset}$=104 bits The preset timing advance is programmed as part of the subscriber unit installation process and is set to 0 if the subscriber unit is within the maximum range of 10 km supported by the variable component alone.

However, outside of this range subscribers may be grouped in zones according to their range from the base station with which they are registered and corresponding larger preset advances $t_{preset}$ to them as follows:-

| Zone | Min Range (km) | Max Range (km) | $t_{preset}$(bits) |
|---|---|---|---|
| A | 0 | 10 | 0 |
| B | 5 | 15 | 17 |
| C | 10 | 20 | 34 |
| D | 15 | 25 | 51 |
| E | 20 | 30 | 68 |

Min Range corresponds to the actual minimum range supported by a total timing advance equal to $t_{preset}$+minimum $t_{adv}$; Max range corresponds to the actual maximum range supported by a total timing advance equal to $t_{preset}$+ maximum $t_{adv}$.

We claim:

1. A method of controlling the timing of transmissions of data packets from at least one first transmitting and receiving unit (NTE) to a second transmitting and receiving unit (BTE) in predetermined time slots within fixed length time frames, the second unit transmitting a timing reference signal to a first unit, the first unit transmitting in response a relatively short first packet at a time dependent on a preset first value, the first value being a predetermined estimate of the propagation delay dependent on the approximate separation of the first unit and the second unit, the second unit determines a second value dependent upon the actual propagation delay from the time of reception of the first packet, and the second unit transmits an adjustment signal dependent upon at least the second value to the first unit to adjust the timing of subsequent transmissions of relatively long packets from the first unit in response thereto.

2. A method of controlling the timing of transmissions according to claim 1, in which the timing adjustment signal for a first unit includes a first component which is representative of the second value and a second component which is representative of the preset first value.

3. A method of controlling the timing of transmissions according to claim 2, in which once the first component is determined, the adjustment signal is sent to the first unit to set the timing adjustment to be used for subsequent information packets.

4. A method of controlling the timing of transmissions according to claim 1, in which transmissions are by radio.

5. A method of controlling the timing of transmissions according to claim 1, in which each first unit comprises a subscriber unit at a fixed location and the second unit is a base station.

6. A method of controlling the timing of transmissions according to claim 1, in which the first packet contains system control data and/or short information messages.

7. A method of controlling the timing of transmissions according to claim 1, in which the relatively long packets contain both system control data and other information, such as user data.

8. A method of controlling the timing of transmissions according to claim 1, in which first packets are sent repeatedly over a period of time for reception by the second unit so as to enable correct determination of a timing adjustment should the first one of the first packets not be received.

9. A method according to claim 8, in which a subsequent one of the first packets is sent at a different frequency.

10. Timing control means for controlling the timing of transmission of data packets from a first transmitting and receiving unit (NTE) to a second transmitting and receiving unit (BTE) in predetermined time slots within fixed length time frames, the second unit comprising timing reference signal transmission means, and the first unit comprising response means operative to transmit in response to receipt of a timing reference signal a relatively short first packet at a time dependent on a preset first value, the first value being a predetermined estimate of the propagation delay dependent on the approximate separation of the first unit and the second unit, the second unit further comprising determination means operative to determine a second value dependent upon the actual propagation delay from the time of reception of the first packet, and the second unit further comprising controlling means operative to transmit an adjustment signal dependent upon at least the second value to the first unit, the first unit further comprising adjustment means operative to adjust the timing of subsequent transmissions of relatively long packets in response thereto.

11. Timing control means according to claim 10, in which the controlling means transmits an adjustment signal including a first component and a second component, the first component being representative of the second value and the second component being representative of the preset first value.

12. Timing control means according to claim 10, in which the second unit comprises a base station and the first unit comprises a subscriber unit at a fixed location.

13. A method of adjustment of timing of up-link and down-link packets sent in time slots within fixed length time frames, including the steps of sending a reference signal from a base station, receiving the reference signal at a subscriber unit, sending a relatively short first packet from the subscriber unit in response to said reference signal, the relatively short first packet being sent at a time dependent on a preset value, the preset value being a predetermined estimate of the propagation delay dependent on the approximate separation of the subscriber unit and the base station, receiving the first packet at the base station, the base station determining a timing adjustment by measuring the timing of receipt of said first packet, and the base station transmitting an adjustment signal dependent upon said timing adjustment to the subscriber unit to adjust its timing of subsequent transmissions of relatively long packets.

* * * * *